(12) United States Patent
Ogawa et al.

(10) Patent No.: US 12,176,786 B2
(45) Date of Patent: Dec. 24, 2024

(54) WATERPROOF FAN

(71) Applicant: SANYO DENKI CO., LTD., Tokyo (JP)

(72) Inventors: Noriaki Ogawa, Tokyo (JP); Satoshi Nakazawa, Tokyo (JP); Toshiya Nishizawa, Tokyo (JP); Izumi Onozawa, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 370 days.

(21) Appl. No.: 17/855,889

(22) Filed: Jul. 1, 2022

(65) Prior Publication Data

US 2023/0006499 A1    Jan. 5, 2023

(30) Foreign Application Priority Data

Jul. 5, 2021    (JP) .................................. 2021-111556
May 20, 2022   (JP) .................................. 2022-083141

(51) Int. Cl.
| | |
|---|---|
| *H02K 5/10* | (2006.01) |
| *F04D 25/06* | (2006.01) |
| *H02K 3/34* | (2006.01) |
| *H02K 5/08* | (2006.01) |
| *H02K 5/22* | (2006.01) |

(52) U.S. Cl.
CPC ........... *H02K 5/10* (2013.01); *F04D 25/0613* (2013.01); *H02K 3/345* (2013.01); *H02K 5/08* (2013.01); *H02K 5/225* (2013.01); *H02K 2203/03* (2013.01)

(58) Field of Classification Search
CPC .. H02K 5/08; H02K 5/10; H02K 5/16; H02K 5/22; H02K 5/225; H02K 3/345; H02K 2203/03
See application file for complete search history.

(56) References Cited

U.S. PATENT DOCUMENTS

| | | | | |
|---|---|---|---|---|
| 6,158,985 | A * | 12/2000 | Watanabe | ............. F04D 29/083 |
| | | | | 417/423.14 |
| 6,551,074 | B2 * | 4/2003 | Kudo | .................... F04D 29/083 |
| | | | | 417/354 |

(Continued)

FOREIGN PATENT DOCUMENTS

JP          2020-88990        6/2020

*Primary Examiner* — Daniel C Puentes
*Assistant Examiner* — Masoud Vaziri
(74) *Attorney, Agent, or Firm* — RANKIN, HILL & CLARK LLP (57) ABSTRACT

Provided is a waterproof fan which includes: a rotor; a stator including a winding; a circuit board supplying power to the winding; a resin frame including an undersurface located on one side of a rotation axis of a rotor, and a housing space opening on the other side of the rotation axis, to house the circuit board; a waterproofing resin portion covering the stator and closing an opening of the housing space; a bearing rotatably supporting the rotating shaft portion; and a cylindrical metal bearing holder extending along the rotation axis and supporting the bearing, in which the frame includes a tubular holder protection portion extending from the undersurface to the other side of the rotation axis and covering at least a part of an outer peripheral surface of the bearing holder, and the holder protection portion separates the stator from the bearing holder.

10 Claims, 7 Drawing Sheets

(56) References Cited

U.S. PATENT DOCUMENTS

| | | | | |
|---|---|---|---|---|
| 6,828,706 | B2* | 12/2004 | Kudo | F04D 25/0646 |
| | | | | 310/43 |
| 7,667,359 | B2* | 2/2010 | Lee | H02K 5/04 |
| | | | | 310/43 |
| 10,110,085 | B2* | 10/2018 | Lin | H02K 1/04 |
| 10,465,692 | B2* | 11/2019 | Kudo | F04D 25/082 |
| 2004/0245878 | A1* | 12/2004 | Kim | H02K 29/08 |
| | | | | 310/114 |
| 2010/0033041 | A1* | 2/2010 | Watanabe | F04D 25/0613 |
| | | | | 310/63 |
| 2012/0269666 | A1* | 10/2012 | Lin | F04D 25/064 |
| | | | | 310/68 R |
| 2015/0167682 | A1* | 6/2015 | Ishihara | F04D 25/0686 |
| | | | | 417/354 |
| 2020/0161941 | A1* | 5/2020 | Yamasaki | H02K 11/215 |
| 2020/0303990 | A1* | 9/2020 | Takakuwa | H02K 11/33 |

\* cited by examiner

WATERPROOF FAN

CROSS-REFERENCE TO RELATED APPLICATION

This application is based on Japanese Patent Application No. 2021-111556 filed with the Japan Patent Office on Jul. 5, 2021, and on Japanese Patent Application No. 2022-083141 filed with the Japan Patent Office on May 20, 2022, the entire content of both of which is hereby incorporated by reference.

BACKGROUND

1. Technical Field

The present invention relates to a waterproof fan.

2. Related Art

A waterproof fan where electronic components including a circuit board are covered with resin is known from, for example, Patent Literature 1 (JP2020088990 (A)). In the waterproof fan described in Patent Literature 1, a metal bearing support cylinder portion supports a bearing that supports a rotor.

SUMMARY

A waterproof fan according to the present embodiment includes: a rotor including a rotating shaft portion rotatable about a rotation axis, and a rotating blade; a stator including a winding; a circuit board configured to supply power to the winding; a resin frame including an undersurface located on one side of the rotation axis, and a housing space opening on the other side of the rotation axis and housing the circuit board; a waterproofing resin portion covering the stator and closing an opening of the housing space; a bearing supporting the rotating shaft portion in such a manner that the rotating shaft portion is rotatable about the rotation axis; and a cylindrical metal bearing holder extending along the rotation axis and supporting the bearing, in which the frame includes a tubular holder protection portion extending from the undersurface to the other side of the rotation axis and covering at least a part of an outer peripheral surface of the bearing holder, and the holder protection portion separates the stator from the bearing holder.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A waterproofing resin that covers the electronic components (including the circuit board) is very different in the coefficient of linear expansion from the metal forming the bearing support cylinder portion. Hence, a gap may be created in an interface between the waterproofing resin and the bearing support cylinder portion when thermal stress acts repeatedly on the waterproof fan, which may allow the ingress of water through the gap.

In such a case, the interface between the bearing support cylinder portion and the waterproofing resin is exposed to the outside in the waterproof fan described in Patent Literature 1. Therefore, water may enter the waterproof fan from the interface along the bearing support cylinder portion, and the water that has entered may reach the circuit board.

Hence, the present invention provides a waterproof fan that resists the ingress of water to a circuit board even if thermal stress acts repeatedly thereon.

Means for Solving the Problem

A waterproof fan according to an aspect of the present invention includes: a rotor including a rotating shaft portion rotatable about a rotation axis, and a rotating blade; a stator including a winding; a circuit board configured to supply power to the winding; a resin frame including an undersurface located on one side of the rotation axis, and a housing space opening on the other side of the rotation axis and housing the circuit board; a waterproofing resin portion covering the stator and closing an opening of the housing space; a bearing supporting the rotating shaft portion in such a manner that the rotating shaft portion is rotatable about the rotation axis; and a cylindrical metal bearing holder extending along the rotation axis and supporting the bearing, in which the frame includes a tubular holder protection portion extending from the undersurface to the other side of the rotation axis and covering at least a part of an outer peripheral surface of the bearing holder, and the holder protection portion separates the stator from the bearing holder.

A waterproof fan according to another aspect of the present invention includes: a rotor including a rotating shaft portion rotatable about a rotation axis, and a rotating blade; a stator including a winding; a circuit board configured to supply power to the winding; a resin frame including an undersurface located on one side of the rotation axis, and a housing space opening on the other side of the rotation axis and housing the circuit board; a waterproofing resin portion covering the stator and closing an opening of the housing space; a bearing supporting the rotating shaft portion in such a manner that the rotating shaft portion is rotatable about the rotation axis; and a cylindrical metal bearing holder extending along the rotation axis and supporting the bearing, in which the frame includes a tubular first holder protection portion extending from the undersurface to the other side of the rotation axis and covering a part of an outer peripheral surface of the bearing holder, a tubular second holder protection portion covering the other part of the outer peripheral surface of the bearing holder is provided further to the other side of the rotation axis than the first holder protection portion, and at least the second holder protection portion separates the stator from the bearing holder.

According to the present invention, it is possible to provide a waterproof fan that resists the ingress of water to a circuit board even if thermal stress acts repeatedly thereon.

Embodiments of the present invention are described hereinafter with reference to the drawings. Descriptions of members having the same reference numerals as members already described in the detailed description are omitted for the convenience of description. Moreover, the dimensions of each member illustrated in the drawings may be different from actual dimensions thereof for the convenience of description.

Figure 1:
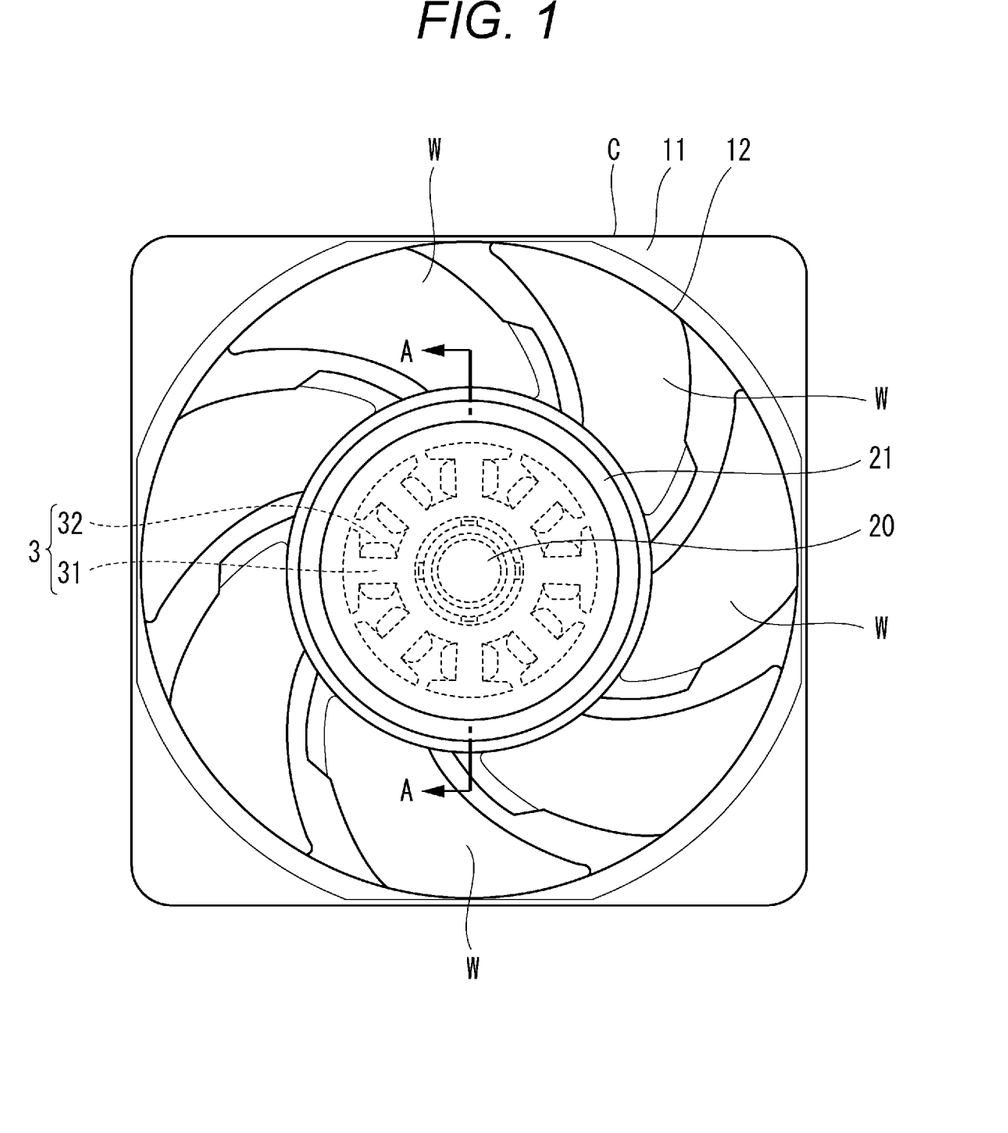
FIG. 1 is a front view of a waterproof fan according to an embodiment of the present invention.

FIG. 1 is a front view of a waterproof fan 1 according to an embodiment of the present invention. As illustrated in FIG. 1, the waterproof fan 1 includes a plurality of (seven in the example illustrated in the drawing) rotating blades W that can rotate about a rotating shaft portion 20, and a cylindrical casing C that surrounds the periphery of the rotating blades W. The waterproof fan 1 rotates the rotating blades W to produce a current of air that flows from one side to the other in a direction of an axis of the rotating shaft portion 20 (in a direction into the page in the drawing). In the following description, for the sake of convenience, the direction of the axis of the rotating shaft portion 20 may be referred to as a direction of a "rotation axis X." Moreover, a direction orthogonal to the rotation axis X may be referred to as a "radial direction."

The plurality of rotating blades W is radially attached to the perimeter of an impeller boss portion 21. The impeller boss portion 21 is formed in a substantially cup shape, and is provided in such a manner as to surround the rotating shaft portion 20. The interior of a stator 3 of the waterproof fan 1 illustrated in FIG. 1 is drawn by broken lines.

The rotating blades W attached to the impeller boss portion 21 rotate and produce a current of air between the rotating blades W and the casing C. The rotating blades W are formed with a shape and structure that produces a current of air from the one side to the other of the rotation axis X. Moreover, the casing C that surrounds the rotating blades W includes a frame portion 11 formed in the form of a rectangle, and a circular wind tunnel portion 12 that is defined and formed in the center of the frame portion 11 and guides air flow.

First Embodiment

Figure 2:
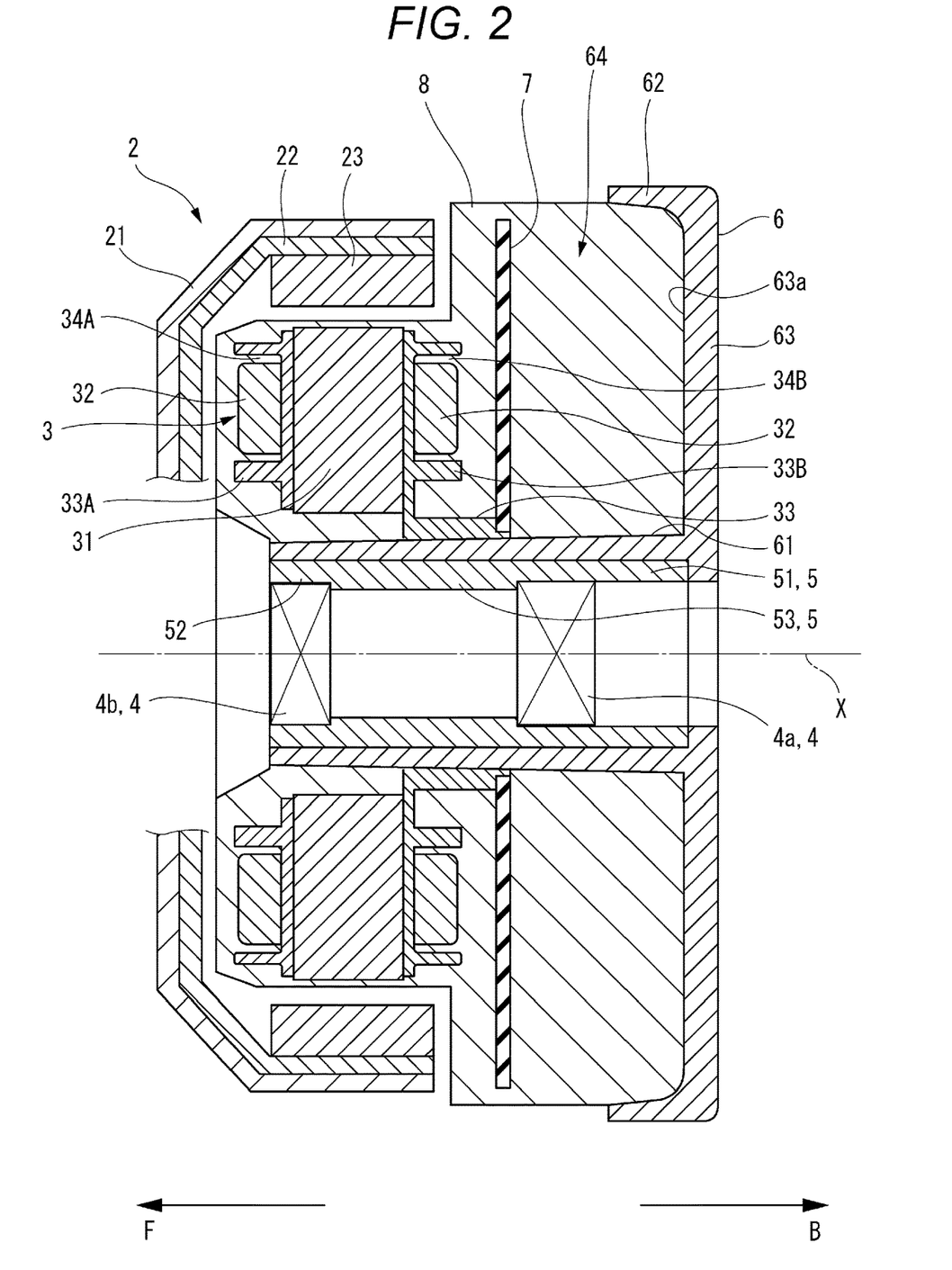
FIG. 2 is a cross-sectional view of a waterproof fan according to a first embodiment of the present invention, taken along line A-A illustrated in FIG. 1.

FIG. 2 is a cross-sectional view of the waterproof fan according to a first embodiment of the present invention, taken along line A-A illustrated in FIG. 1. In the following description, the one side of the rotation axis X may be referred to as a back B, and the other side, which is opposite to the one side, of the rotation axis X may be referred to as a front F for the sake of convenience.

As illustrated in FIG. 2, the waterproof fan 1 includes a rotor 2, the stator 3, a bearing 4, a bearing holder 5, a frame 6, a circuit board 7, and a waterproofing resin portion 8. The structure of the waterproof fan 1 is symmetrical about the rotation axis X. Therefore, the upper half in FIG. 2 is described below.

The rotor 2 includes the impeller boss portion 21 with the rotating blades W, a rotor cover 22 provided in the impeller boss portion 21, permanent magnets 23 fixed to the rotor cover 22, and the rotating shaft portion 20 press-fitted via a bushing (not illustrated) in a central part of the impeller boss portion 21 and the rotor cover 22. The rotating shaft portion 20 is omitted in FIG. 2.

The rotor cover 22 has a substantially cup shape, and is fitted in the impeller boss portion 21. The rotor cover 22 is made of, for example, a magnetic substance such as a carbon steel casting (SC material). The permanent magnets 23 are fastened to an inner peripheral surface, in the radial direction, of the rotor cover 22 in such a manner as to be arranged in the circumferential direction. The rotor cover 22 passes magnetic flux and serves as a part of a magnetic circuit.

The rotating shaft portion 20 is provided in such a manner as to be rotatable about the rotation axis X. The rotating shaft portion 20 is supported by the bearing 4 including a first bearing 4a and a second bearing 4b.

The stator 3 is provided further to the back B than the rotor 2. The stator 3 includes a plurality of stator cores 31, windings 32 that are each wound around a respective stator core 31, and an insulator 33 provided between the stator cores 31 and the windings 32.

The stator cores 31 are placed inward, in the radial direction, of the rotating blades W. Each of the stator cores 31 extends in the radial direction relative to the rotation axis X. The stator core 31 is provided in such a manner that an outer surface thereof in the radial direction faces an inner surface, in the radial direction, of the permanent magnet 23 fixed to the rotor cover 22. The stator core 31 is formed by laminating a plurality of thin metal plates in the thickness direction. Examples of the material of the stator core 31 include a silicon steel plate.

Each of the stator cores 31 is fixed, via the insulator 33, to an outer side, in the radial direction, of a holder protection portion 61 (described below) forming the frame 6. The insulator 33 includes a front insulator 33A provided to a surface of the stator core 31 on the front F side, and a back insulator 33B provided to a surface of the stator core 31 on the back B side. The front insulator 33A is provided with a front inner protruding portion and a front outer protruding portion that extend to the front F. A front slot 34A is formed between the front inner protruding portion and the front outer protruding portion. The back insulator 33B is provided with a back inner protruding portion and a back outer protruding portion that extend to the back B. A back slot 34B is formed between the back inner protruding portion and the back outer protruding portion.

The winding 32 is wound around the stator core 31. The winding 32 is housed in the front slot 34A and the back slot 34B. The front insulator 33A is provided between the winding 32 and a front surface of the stator core 31. The back insulator 33B is provided between the winding 32 and a back surface of the stator core 31. Hence, insulation between the winding 32 and the stator core 31 is secured in the direction of the rotation axis X. Moreover, the shape of the front insulator 33A is larger than the shape of the stator core 31, and the shape of the back insulator 33B is larger than the shape of the stator core 31, as viewed in the direction of the rotation axis X. Hence, insulation is also secured between the stator core 31 and the winding 32 located between the front insulator 33A and the back insulator 33B.

The bearing 4 includes the first bearing 4a provided on the back B side, and the second bearing 4b provided on the front F side. The first bearing 4a and the second bearing 4b support the rotating shaft portion 20 in such a manner that the rotating shaft portion 20 can rotate about the rotation axis X.

The bearing holder 5 is a cylindrical holder extending along the rotation axis X. the bearing holder 5 is made of metal. The first bearing 4a and the second bearing 4b are inserted into the bearing holder 5. The bearing holder 5 supports the first bearing 4a and the second bearing 4b. The bearing holder 5 includes a first bearing support portion 51 provided on the back B side, a second bearing support portion 52 provided on the front F side, and a small-diameter portion 53 provided between the first bearing support portion 51 and the second bearing support portion 52. The first bearing support portion 51 supports the first bearing 4a. The second bearing support portion 52 supports the second bearing 4b. The small-diameter portion 53 is formed with a smaller diameter than the inner diameter of the first bearing support portion 51 and the inner diameter of the second bearing support portion 52.

The frame 6 is provided at a position on the back B side in the configuration of the waterproof fan 1. The frame 6 has a substantially cup shape. The frame 6 is provided along the direction of the rotation axis X in such a manner that the inner side of the cup shape thereof is in a position of facing the inner side of the cup shape of the impeller boss portion 21 to which the rotating blades W are attached. The frame 6 is made of resin.

The frame 6 includes the holder protection portion 61 provided on an inner side in the radial direction, an outer cylinder portion 62 that has a larger diameter than the holder protection portion 61 and is provided on an outer side in the radial direction, and a bottom portion 63 provided on the back B side to connect the holder protection portion 61 and the outer cylinder portion 62. The frame 6 includes a housing space 64 that is formed by the holder protection portion 61, the outer cylinder portion 62, and the bottom portion 63. The housing space 64 is a space that opens on the front F side. The circuit board 7 is housed in the housing space 64.

The bottom portion 63 is provided in such a manner as to expand in the radial direction from an outer peripheral surface, in the radial direction, of the holder protection portion 61 to an inner peripheral surface, in the radial direction, of the outer cylinder portion 62. The bottom portion 63 is provided in such a manner as to cover a space on the back B side of the stator 3.

The circuit board 7 is provided further to the back B than the stator 3. The circuit board 7 is housed in the housing space 64. The circuit board 7 is formed in the form of a circular doughnut having an opening in a central part thereof. The circuit board 7 is provided in such a manner as to surround the holder protection portion 61 of the frame 6 by inserting the holder protection portion 61 through the opening. The opening of the circuit board 7 is formed with a diameter that provides predetermined clearance between an edge of the opening and the outer peripheral surface of the holder protection portion 61. A wiring pattern for controlling the rotor 2 and the stator 3 is formed on the circuit board 7. The circuit board 7 supplies power to the windings 32 wound around the stator cores 31.

An inner end portion, in the radial direction, of the circuit board 7 is supported by the holder protection portion 61 and the insulator 33. The end portion of the circuit board 7 is fitted on a notch portion formed at a distal end portion, on the back B side, of the insulator 33 to position the circuit board 7 relative to the insulator 33. The notch portion of the insulator 33 is formed only in a part of the distal end portion of the insulator 33 in the circumferential direction. The insulator 33 supports the circuit board 7 only at a part thereof in the circumferential direction. The holder protection portion 61 supports the circuit board 7 at a step portion 101c (described below in FIG. 4) provided to the holder protection portion 61.

The waterproofing resin portion 8 is provided in such a manner as to cover the stator 3 and the circuit board 7. The waterproofing resin portion 8 is made of an electrical insulating synthetic resin. The waterproofing resin portion 8 is made of, for example, a thermosetting epoxy resin. The resin is filled in such a manner as to cover the stator 3 and the circuit board 7 so that the waterproofing resin portion 8 closes the opening of the housing space 64. The resin of the waterproofing resin portion 8 is filled in, for example, a gap between the stator 3 and the circuit board 7, and a gap between an undersurface 63a of the bottom portion 63 of the frame 6 and the circuit board 7, in the housing space 64.

As mentioned above, the frame 6 includes the holder protection portion 61. The holder protection portion 61 is a tubular part extending continuously to the front F from an inner end portion, in the radial direction, of the bottom portion 63. The holder protection portion 61 is inserted through a central part of the stator 3. The insert-molded cylindrical bearing holder 5 is in the holder protection portion 61. The holder protection portion 61 covers at least a part of an outer peripheral surface of the bearing holder 5. Consequently, the holder protection portion 61 separates the stator 3 from the outer peripheral surface of the bearing holder 5.

The waterproof fan 1 according to the embodiment includes: the rotor 2 having the rotating shaft portion 20 that can rotate about the rotation axis X, and the rotating blades W; the stator 3 having the plurality of stator cores 31 extending in the radial direction relative to the rotation axis X, the insulator 33 that secures insulation between the stator cores 31 and the windings 32; the circuit board 7; the resin frame 6 having the undersurface 63a located on the back B side, and the housing space 64 that opens on the front F side and houses the circuit board 7; the waterproofing resin portion 8 that covers the stator 3 and closes the opening of the housing space 64; the bearing 4 that supports the rotating shaft portion 20 in such a manner that the rotating shaft portion 20 can rotate about the rotation axis X; and the cylindrical metal bearing holder 5 that extends along the rotation axis X and supports the bearing 4.

The frame 6 includes the tubular holder protection portion 61 that extends to the front F from the undersurface 63a and covers at least a part of the outer peripheral surface of the bearing holder 5. The holder protection portion 61 separates the stator 3 from the bearing holder 5.

The bearing holder 5 is made of metal. The holder protection portion 61 generally comprises a lightweight nonmetallic material such as resin. Hence, if thermal stress acts repeatedly on the waterproof fan 1, a gap may be created between the outer peripheral surface of the bearing holder 5 and an inner peripheral surface of the holder protection portion 61. As a result, water may enter from an interface between the bearing holder 5 and the waterproofing resin portion 8, and reach the stator 3 located in the waterproof fan 1, along the outer peripheral surface of the bearing holder 5.

However, in the waterproof fan 1 according to the embodiment, the stator 3 is separated from the bearing holder 5 by the holder protection portion 61. Hence, the water that enters along the outer peripheral surface of the bearing holder 5 does not come straight into contact with the stator 3.

In the illustrated example, a front end of the holder protection portion 61 is extended up to a position in line with a front end of the bearing holder 5. Hence, the water that enters between the bearing holder 5 and the holder protection portion 61 is blocked by the holder protection portion 61 and therefore does not reach the stator 3.

More specifically, the stator 3 of the waterproof fan 1 of the embodiment includes the plurality of stator cores 31 extending in the radial direction relative to the rotation axis, the windings 32 each wound around a respective stator core 31, and the insulator 33 (the back insulator 33B) that insulates between the stator cores 31 and the windings 32. An inner peripheral surface of the insulator 33 is in contact with the outer peripheral surface of the holder protection portion 61. The holder protection portion 61 extends forward of (further to the other side of the rotation axis than) a contact portion between the holder protection portion 61 and the insulator 33, and blocks between the bearing holder 5 and the insulator 33. Hence, the water that enters along the outer peripheral surface of the bearing holder 5 cannot enter a space on the stator 3 side beyond the holder protection portion 61.

Figure 3:
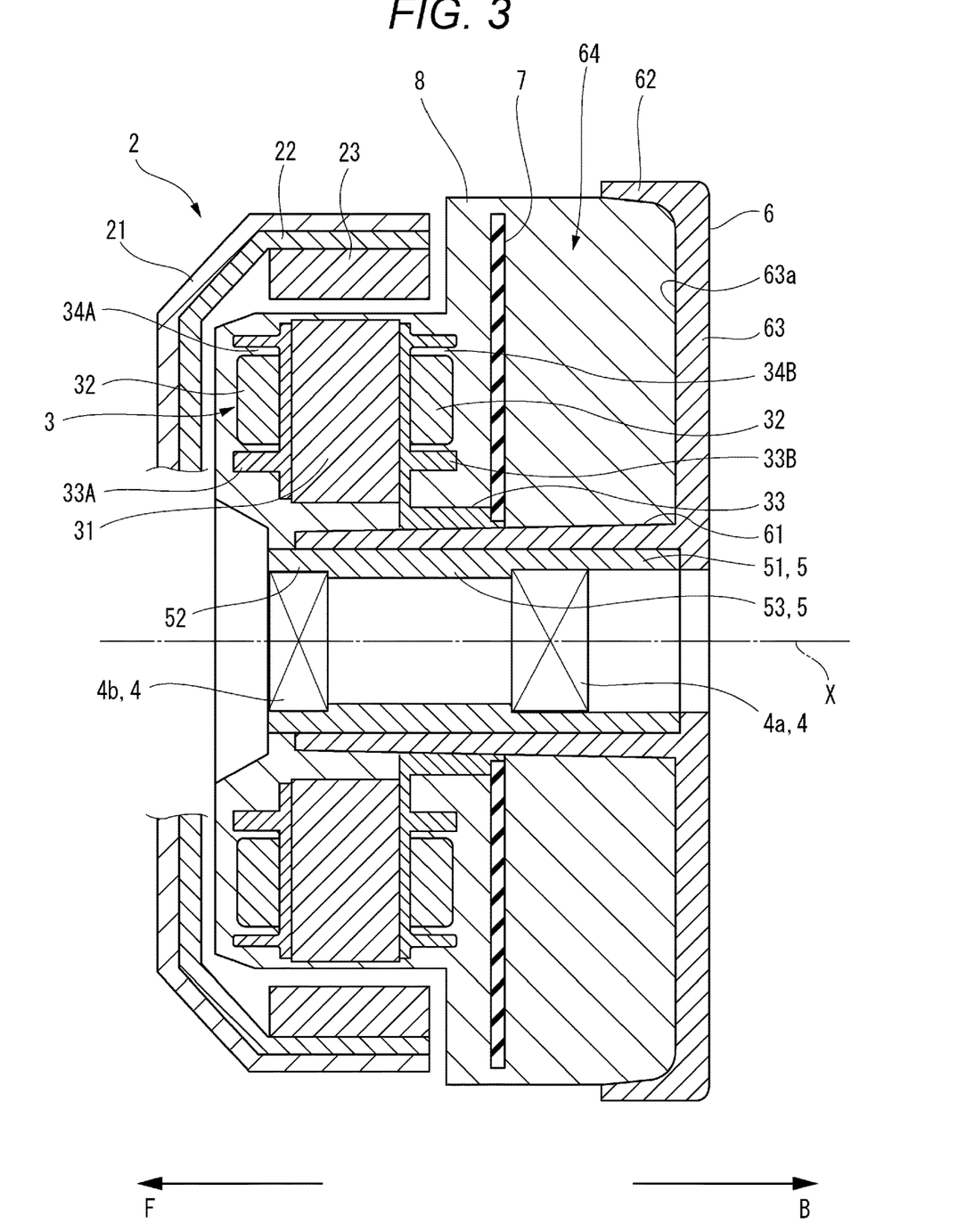
FIG. 3 is a diagram similar to FIG. 1 according to a modification of the first embodiment of the present invention.

In the example illustrated in FIG. 2, it has been described that the holder protection portion has the shape that completely covers the outer peripheral surface of the bearing holder. However, according to the waterproof fan 1 of the present invention, the front end of the holder protection portion 61 may be located backward of the front end of the bearing holder 5 as illustrated in FIG. 3. FIG. 3 is a diagram illustrating the waterproof fan 1 according to a modification of the first embodiment of the present invention. In this case, it is preferable that the waterproofing resin portion 8 be present between the stator 3 and the bearing holder 5 that are separated by the holder protection portion 61 as illustrated graphically.

In the example illustrated in FIG. 3, an interface between the holder protection portion 61 and the waterproofing resin portion 8 is present on the outer peripheral surface of the bearing holder 5. Hence, it is conceivable that the water that enters along the outer peripheral surface of the bearing holder 5 further enters the stator 3 from the interface between the holder protection portion 61 and the waterproofing resin portion 8. However, both the holder protection portion 61 and the waterproofing resin portion 8 are made of resin. Hence, even if thermal stress acts repeatedly, the interface between the holder protection portion 61 and the waterproofing resin portion 8 do not open wide, which hardly allows the ingress of water into the stator 3 from the interface between the holder protection portion 61 and the waterproofing resin portion 8. If the holder protection portion 61 and the waterproofing resin portion 8 are made of the same resin, or alternatively if the holder protection portion 61 and the waterproofing resin portion 8 are made of resins each having an equal coefficient of linear expansion, it further facilitates blocking the ingress of water into the stator 3.

Moreover, according to the waterproof fan 1, the stator 3 includes the plurality of stator cores 31 extending in the radial direction relative to the rotation axis X, and the insulator 33 that secures insulation between the stator cores 31 and the windings 32. Through-holes 9 that penetrate from the front F to the back B are provided in parts in the circumferential direction between the outer peripheral surface of the holder protection portion 61 and the inner peripheral surface of the insulator 33. Hence, the waterproofing resin can flow smoothly from the front F to the back B, or from the back B to the front F, along the through-holes 9 when the waterproofing resin portion 8 is molded by insert molding. Therefore, it is possible to fill the waterproofing resin with no gaps and form the waterproofing resin portion 8, and to ensure high water resistance for the circuit board 7.

Figure 4:
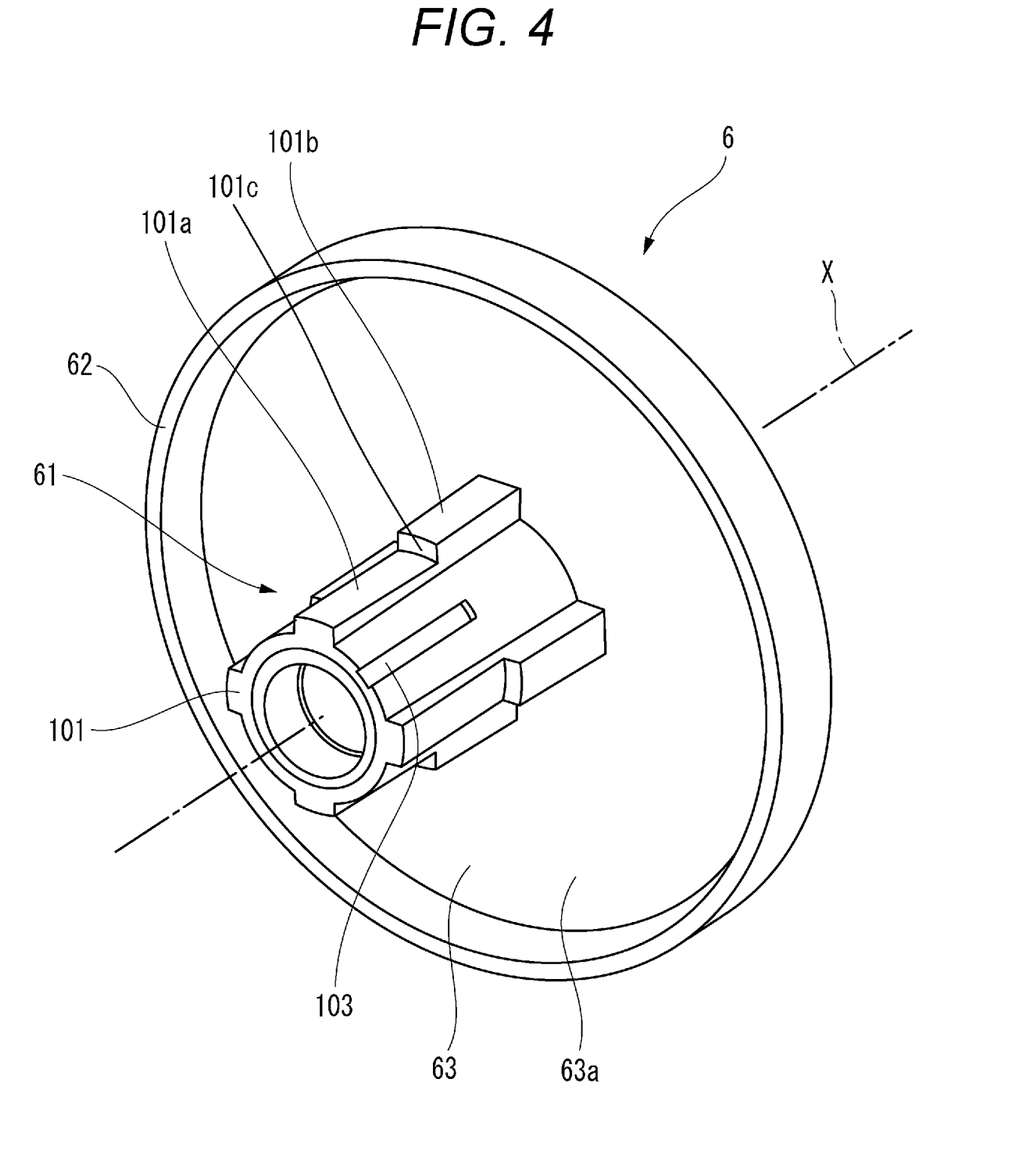
FIG. 4 is a perspective view of a frame of the first embodiment of the present invention.

FIG. 4 is a perspective view of the frame 6 of the first embodiment of the present invention. As illustrated in FIG. 4, the holder protection portion 61 of the frame 6 extends substantially perpendicularly from the undersurface 63a with the rotation axis X as the center on a central part of the bottom portion 63.

The outer peripheral surface of the holder protection portion 61 is provided with a plurality of (four in the example illustrated in the drawing) ridge portions 101 that protrudes in the radial direction. The four ridge portions 101 are provided, spaced at regular intervals in the circumferential direction. Each of the ridge portions 101 is provided with a small-diameter ridge portion 101a and a large-diameter ridge portion 101b, the ridges of which each has a different height. The large-diameter ridge portion 101b is a ridge portion that protrudes higher than the small-diameter ridge portion 101a. The difference in diameter between the small-diameter ridge portion 101a and the large-diameter ridge portion 101b forms the step portion 101c on a boundary between both portions. The step portion 101c functions as a board positioning portion that determines the position of the circuit board 7 in the direction of the rotation axis X. The step portion 101c supports the inner end portion, in the radial direction, of the circuit board 7.

Moreover, the outer peripheral surface, in the radial direction, of the holder protection portion 61 is provided with a positioning portion 103 that determines the position of the insulator 33 in the circumferential direction relative to the holder protection portion 61. The positioning portion 103 is formed as, for example, a groove portion along the direction of the rotation axis X. A projection portion (not illustrated) provided on the inner peripheral surface, in the radial direction, of the insulator 33 fits in the positioning portion 103 to determine the position of the insulator 33 relative to the holder protection portion 61.

Figure 5:
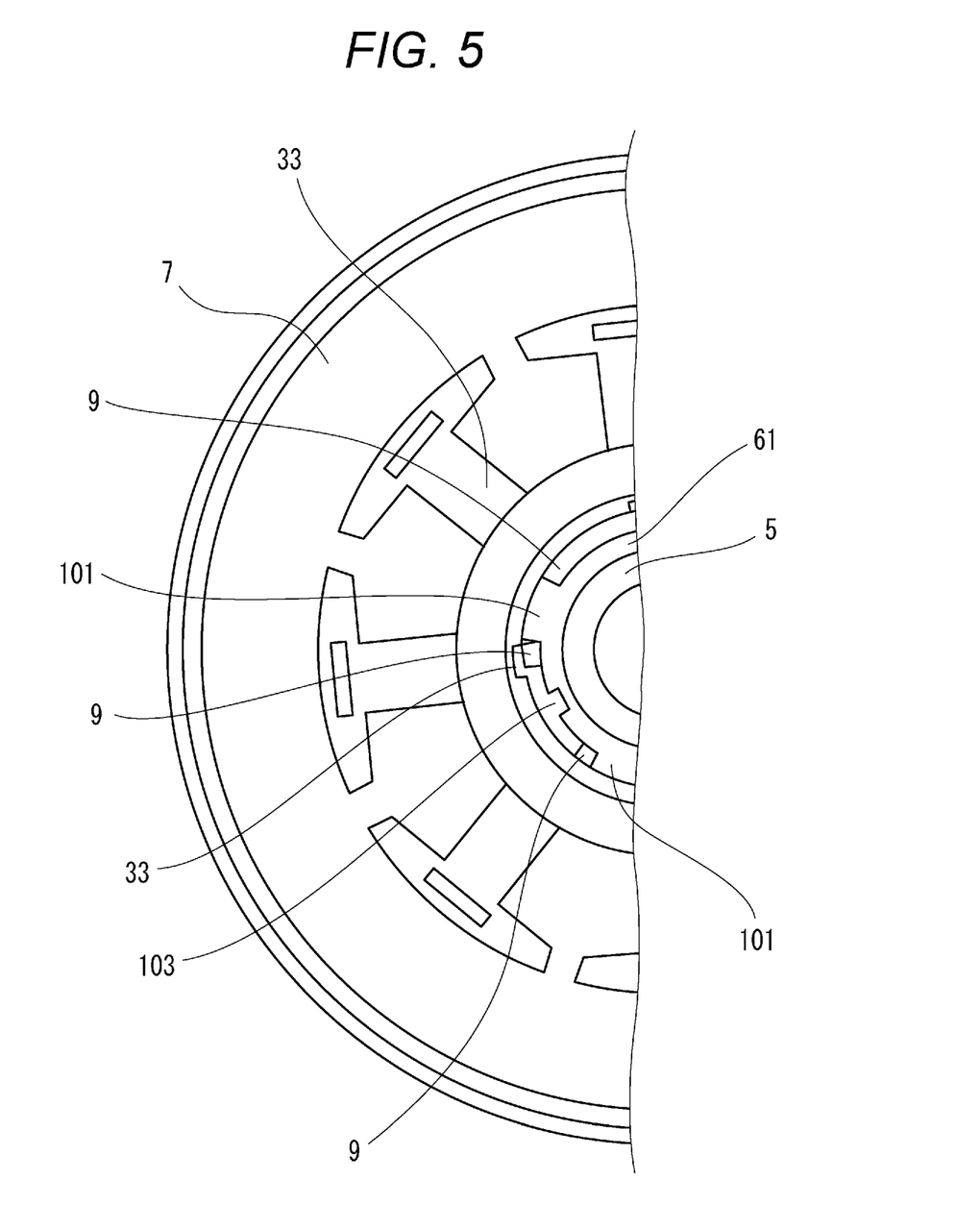
FIG. 5 is a top view of the waterproof fan of the first embodiment of the present invention.

FIG. 5 is a top view of the waterproof fan 1 of the first embodiment of the present invention (a diagram of the waterproof fan 1 as viewed from the front). In FIG. 5, the waterproofing resin portion 8 and the windings 32 are omitted. As illustrated in FIG. 5, the through-holes 9 that penetrate in the direction along the rotation axis X are provided between the outer peripheral surface of the holder protection portion 61 of the frame 6 and the inner peripheral surface of the insulator 33. The through-holes 9 are provided in parts in the circumferential direction. The through-holes 9 are provided, for example, in the circumferential direction between the ridge portions 101 of the holder protection portion 61. The plurality of through-holes 9 is provided in the circumferential direction. As a result, an outer peripheral part of the holder protection portion 61 has a structure including gaps that communicate between the front F side of the waterproof fan 1 and the undersurface 63a of the bottom portion 63 along the outer peripheral surface of the holder protection portion 61.

Second Embodiment

A waterproof fan of a second embodiment is described in detail below by use of FIGS. 6 and 7. A description of contents that overlap with the first embodiment is omitted.

Figure 6:
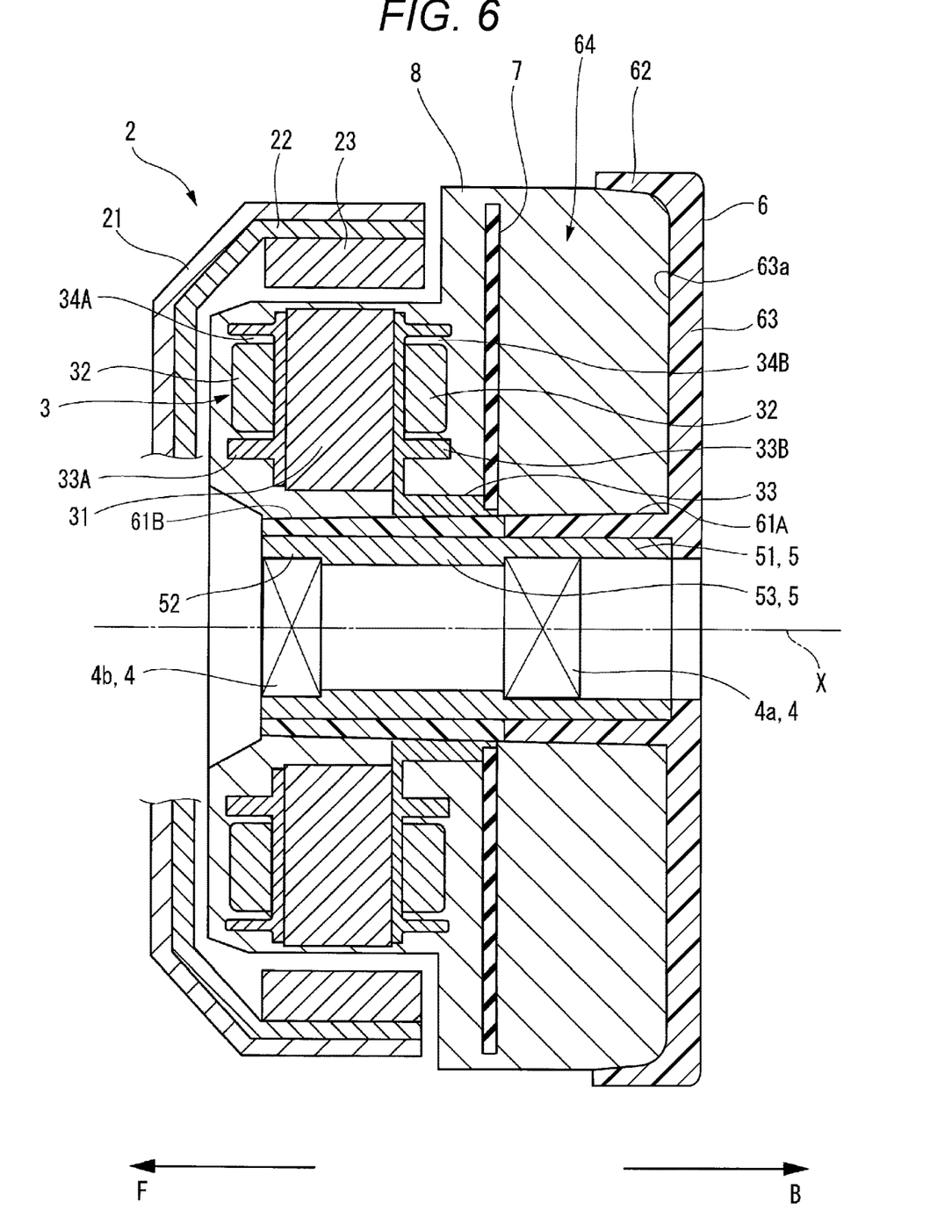
FIG. 6 is a cross-sectional view of a waterproof fan according to a second embodiment of the present invention, taken along line A-A illustrated in FIG. 1.
Figure 7:
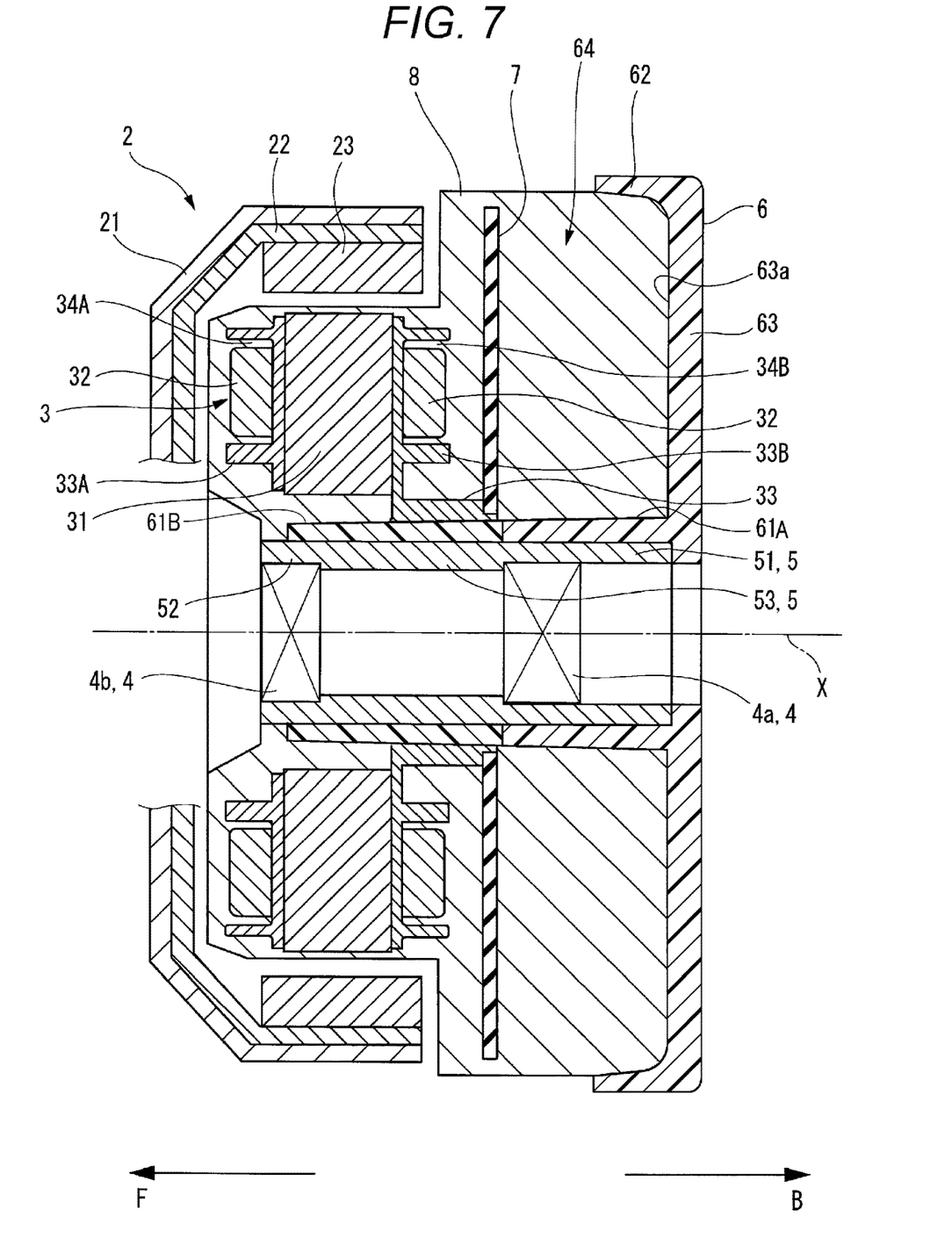
FIG. 7 is a diagram similar to FIG. 6 according to a modification of the second embodiment of the present invention.

FIG. 6 is a cross-sectional view of the waterproof fan according to the second embodiment of the present invention, taken along line A-A illustrated in FIG. 1.

As illustrated in FIG. 6, in the waterproof fan of the second embodiment, the holder protection portion 61 (refer to FIG. 2) of the waterproof fan of the first embodiment includes two separate parts: a first holder protection portion 61A and a second holder protection portion 61B. In other words, the first holder protection portion 61A is a part of the frame 6, and the second holder protection portion 61B is a part separate from the frame 6. The second holder protection portion 61B is a tubular part provided forward of (further to the other side of the rotation axis than) an end portion of the first holder protection portion 61A that is opposite to the bottom portion 63. The first holder protection portion 61A and the second holder protection portion 61B are both inserted through the central part of the stator 3.

A part of the bearing holder 5 including a knurled outer peripheral surface is insert-molded in the first holder protection portion 61A. The first holder protection portion 61A covers a part of the outer peripheral surface of the bearing holder 5.

The second holder protection portion 61B is bonded and fixed to the other part of the outer peripheral surface of the bearing holder 5. The second holder protection portion 61B covers the other part of the outer peripheral surface of the bearing holder 5.

Consequently, the first holder protection portion 61A and the second holder protection portion 61B separate the stator 3 from the outer peripheral surface of the bearing holder 5. Hence, the water that enters along an outer peripheral surface of the bearing holder 5 does not comes straight into contact with the stator 3.

Moreover, a filler may be filled between the first holder protection portion 61A and the second holder protection portion 61B.

Consequently, it becomes even easier to prevent the water that enters along the outer peripheral surface of the first holder protection portion 61A or the second holder protection portion 61B from entering the stator 3 through a gap between the first holder protection portion 61A and the second holder protection portion 61B.

Moreover, the holder protection portion is configured, including two separate parts: the first holder protection portion 61A and the second holder protection portion 61B. As a result, it is possible to reduce the length of the holder protection portion (the first holder protection portion 61A) of the frame 6 in a direction to the front F. Consequently, it is possible to ensure the circularity of a bearing insertion opening (not illustrated) of the first holder protection portion 61A for inserting the bearing holder 5 upon insert molding.

Moreover, the inner peripheral surface of the insulator 33 is in contact with the outer peripheral surface of the second holder protection portion 61B. The second holder protection portion 61B extends forward of (further to the other side of the rotation axis than) a contact portion between the second holder protection portion 61B and the insulator 33, and blocks between the bearing holder 5 and the insulator 33. Hence, the water that enters along the outer peripheral surface of the bearing holder 5 cannot enter a space on the stator 3 side beyond the second holder protection portion 61B.

In the example illustrated in FIG. 6, it has been described that the holder protection portion has the shape that completely covers the outer peripheral surface of the bearing holder. However, according to the waterproof fan 1 of the present invention, a front end of the second holder protection portion 61B may be located backward of the front end of the bearing holder 5 as illustrated in FIG. 7. FIG. 7 is a diagram illustrating the waterproof fan 1 according to a modification of the second embodiment of the present invention. In this case, it is preferable that the waterproofing resin portion 8 be present between the stator 3 and the bearing holder 5 that are separated by the second holder protection portion 61B as illustrated graphically.

Moreover, according to the waterproof fan 1, the stator 3 includes the plurality of stator cores 31 extending in the radial direction relative to the rotation axis X, and the insulator 33 that secures insulation between the stator cores 31 and the windings 32. The through-hole 9 that penetrates from the front F to the back B is provided in a part in the circumferential direction between the outer peripheral surface of the second holder protection portion 61B and the inner peripheral surface of the insulator 33. Hence, the waterproofing resin can flow smoothly from the front F to the back B, or from the back B to the front F, along the through-hole 9 when the waterproofing resin portion 8 is molded by insert molding. Therefore, it is possible to fill the waterproofing resin with no gaps and form the waterproofing resin portion 8, and to ensure high water resistance for the circuit board 7.

Moreover, the outer peripheral surface, in the radial direction, of the second holder protection portion 61B is provided with a positioning portion (not illustrated) that determines the position of the insulator 33 in the circumferential direction relative to the second holder protection portion 61B. The positioning portion is formed as, for example, a groove portion along the direction of the rotation axis X. A projection portion (not illustrated) provided on the inner peripheral surface, in the radial direction, of the insulator 33 fits in the positioning portion to determine the position of the insulator 33 relative to the holder protection portion 61.

Up to this point the embodiments of the present invention have been described. However, it is needless to say that the technical scope of the present invention should not be construed in a limited manner by the description of the embodiments. The embodiments are mere examples. Those skilled in the art understand that the embodiments can be modified in various manners within the scope of the invention described in the claims. The technical scope of the present invention should be determined on the basis of the scope of the invention described in the claims and the scope of equivalents thereof.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:
1. A waterproof fan comprising:
a rotor including a rotating shaft portion rotatable about a rotation axis, and a rotating blade;
a stator including a winding;
a circuit board configured to supply power to the winding;

a resin frame including an undersurface located on one side of the rotation axis, and a housing space opening on the other side of the rotation axis and housing the circuit board;

a waterproofing resin portion covering the stator and closing an opening of the housing space;

a bearing supporting the rotating shaft portion in such a manner that the rotating shaft portion is rotatable about the rotation axis; and a cylindrical metal bearing holder extending along the rotation axis and supporting the bearing, wherein the frame includes a tubular holder protection portion extending from the undersurface to the other side of the rotation axis and covering at least a part of an outer peripheral surface of the bearing holder, and the holder protection portion separates the stator from the bearing holder.

2. The waterproof fan according to claim 1, wherein the stator includes:
- a plurality of stator cores extending in a radial direction relative to the rotation axis; and
- an insulator configured to insulate between the stator cores and the winding, wherein an inner peripheral surface of the insulator is in contact with an outer peripheral surface of the holder protection portion, and the holder protection portion extends further to the other side of the rotation axis than a contact portion between the holder protection portion and the insulator to block between the bearing holder and the insulator.

3. The waterproof fan according to claim 1, wherein the waterproofing resin portion is present between the stator and the bearing holder that are separated by the holder protection portion.

4. The waterproof fan according to claim 1, wherein the stator includes:
- a plurality of stator cores extending in a radial direction relative to the rotation axis; and
- an insulator configured to secure insulation between the stator cores and the winding, wherein a through-hole penetrating from the one side to the other of the rotation axis is provided to a part in a circumferential direction between an outer peripheral surface of the holder protection portion and an inner peripheral surface of the insulator.

5. The waterproof fan according to claim 1, wherein an outer peripheral surface of the holder protection portion is provided with a positioning portion that positions the circuit board.

6. A waterproof fan comprising:
- a rotor including a rotating shaft portion rotatable about a rotation axis, and a rotating blade;
- a stator including a winding;
- a circuit board configured to supply power to the winding;
- a resin frame including an undersurface located on one side of the rotation axis, and a housing space opening on the other side of the rotation axis and housing the circuit board;
- a waterproofing resin portion covering the stator and closing an opening of the housing space;
- a bearing supporting the rotating shaft portion in such a manner that the rotating shaft portion is rotatable about the rotation axis; and
- a cylindrical metal bearing holder extending along the rotation axis and supporting the bearing, wherein the frame includes a tubular first holder protection portion extending from the undersurface to the other side of the rotation axis and covering a part of an outer peripheral surface of the bearing holder, a tubular second holder protection portion covering the other part of the outer peripheral surface of the bearing holder is provided further to the other side of the rotation axis than the first holder protection portion, and at least the second holder protection portion separates the stator from the bearing holder.

7. The waterproof fan according to claim 6, wherein the stator includes:
- a plurality of stator cores extending in a radial direction relative to the rotation axis; and
- an insulator configured to insulate between the stator cores and the winding, wherein the second holder protection portion extends further to the other side of the rotation axis than a contact portion between the second holder protection portion and the insulator, and blocks between the bearing holder and the insulator.

8. The waterproof fan according to claim 6, wherein the waterproofing resin portion is present between the stator and the bearing holder that are separated by the second holder protection portion.

9. The waterproof fan according to claim 6, wherein the stator includes:
- a plurality of stator cores extending in a radial direction relative to the rotation axis; and
- an insulator configured to secure insulation between the stator cores and the winding, wherein a through-hole penetrating from the one side to the other of the rotation axis is provided to a part in a circumferential direction between an outer peripheral surface of the second holder protection portion and an inner peripheral surface of the insulator.

10. The waterproof fan according to claim 6, wherein an outer peripheral surface of the second holder protection portion is provided with a positioning portion that positions the circuit board.

* * * * *